Feb. 13, 1968 I. DORROS 3,369,229

MULTILEVEL PULSE TRANSMISSION SYSTEM

Filed Dec. 14, 1964 7 Sheets-Sheet 1

INVENTOR
I. DORROS
BY Leonard R. Arnold
ATTORNEY

Feb. 13, 1968 I. DORROS 3,369,229

MULTILEVEL PULSE TRANSMISSION SYSTEM

Filed Dec. 14, 1964 7 Sheets-Sheet 4

United States Patent Office 3,369,229

Patented Feb. 13, 1968

3,369,229

MULTILEVEL PULSE TRANSMISSION SYSTEM

Irwin Dorros, Livingston, N.J., assignor to Bell Telephone Laboratories, Incorporated, New York, N.Y., a corporation of New York Filed Dec. 14, 1964, Ser. No. 417,863
5 Claims. (Cl. 340—347)

ABSTRACT OF THE DISCLOSURE

Binary pulse signals are converted into pulse signals having N possible levels in accordance with a first predetermined code set until a pulse signal is generated having a positive direct current component, whereupon conversion is accomplished in accordance with a second predetermined code set until a pulse signal having a negative direct current component is generated and the conversion again carried out in accordance with the first code set. The incoming signal is divided into words of K bits per word, which are then converted into $\gamma$ symbol words where the ratio $K/\gamma$ is greater than 1 and each symbol has N possible levels and the $2^K$ possible binary words are less in number than the $N^\gamma$ possible N level words. Since $2^K$ possible binary words are less in number than $N^\gamma$ possible N level words, selection of multilevel words is possible such that the resulting signal has no direct current component and a long train of spaces cannot be transmitted. In addition, since the ratio $K/\gamma$ is greater than unity, each symbol of the resulting N bit pulse train carries the information of more than one bit of the original binary pulse train, and as a result less bandwidth is required in order to transmit the resulting signal.

This invention relates to the transmission of information by pulse techniques and more particularly to such transmission in systems containing regenerative pulse amplifiers.

One of the advantages of transmission by pulse code modulation is that the pulse train may be regenerated at a repeater station before the pulses have been degraded by noise or apparatus defects to a point where they can no longer be reliably decoded. After such regeneration the pulses are again clean and sharp and such regeneration can be carried on successively at a number of repeater points between a transmitter station and a receiver station. In carrying out such regeneration it is desirable that the current or voltage amplitudes of the pulses and spaces not sag toward the average current, and to avoid such sag or drift special pulse trains have been employed. One such pulse train is the bipolar pulse pulse train disclosed in United States Patent 2,996,578, which issued to F. T. Andrews, Jr., on Aug. 15, 1961. There each binary "0" is transmitted as the absence of a pulse and each binary "1" is transmitted as a pulse opposite in polarity to the preceding pulse. Because each successive pulse is of opposite polarity, the resulting pulse train is inherently free of drift.

In many pulse transmission systems the repeaters are self-timed in the sense that they derive a timing signal, to govern the regeneration of the transmitted signal, from the transmitted signal itself. As a practical matter it has been found that in order to derive this timing signal from the transmitted signal in an economically feasible system at least one pulse, whether it be a positive going pulse or a negative going pulse, must be received in at least approximately fifteen time slots. In the pulse transmission system described in the above-mentioned patent it is quite possible that a pulse may not be transmitted at least once every fifteen time slots since each binary "0" is transmitted as the absence of a pulse. Thus, a train of binary "0's," longer in duration than fifteen time slots, is transmitted as the absence of a pulse and timing information is then lost.

A first attempt to eliminate or reduce the tendency of the center line of an irregular pulse train to wander or drift while at the same time eliminating the possibility of losing timing information due to the transmission of a long train of "0's" or spaces is disclosed in copending application Serial No. 335,014, filed on January 2, 1964, now Patent No. 3,302,193. In that application a binary pulse signal is converted into a three state signal of positive pulses, negative pulses, and spaces in accordance with a first predetermined code set until a three state signal is generated having a predetermined direct current component, whereupon the conversion is accomplished in accordance with a second predetermined code set until a three state signal having a second predetermined direct current component is generated and the conversion again carried out in accordance with the first code. The code of two code sets insured that as a result of the conversion, the generated three state signal had no direct current component and that a long train of spaces was not transmitted thus facilitating the use of self-timed repeaters in a PCM system.

While the apparatus described in the above-mentioned copending patent application is entirely satisfactory for use in most PCM transmission systems, it is somewhat lacking when used in a high speed PCM system such as one which operates in the range of approximately 220 megabits per second. In such high speed systems if each transmitted bit of the three level code carried only the information content of a single bit of a two level code, as taught in the above-mentioned copending application, the amount of bandwidth required for satisfactory transmission becomes too large from an economic standpoint. Accordingly, a third problem arises which must be solved simultaneously with the two stated above. Briefly stated, the problem is how to reduce the bandwidth required for transmitting a high speed PCM signal while at the same time eliminating both the tendency of the center line of the pulse train to wander or drift while eliminating the possibility of losing timing information due to the transmission of a long train of "0's" or spaces. It should be emphasized that this third problem also exists in much lower speed systems in which it is desired to minimize the bandwidth requirements of the transmission system.

It is therefore an object of this invention to reduce the bandwidth required for the transmission of binary information while at the same time reducing the tendency of the center line of a pulse train to wander and eliminating the possibility of losing timing information due to the transmission of a long train of "0's" or spaces.

In accordance with this invention a binary pulse signal is converted into a pulse signal having N possible levels in accordance with a first predetermined code set until a pulse signal is generated having a positive direct current component, whereupon conversion is accomplished in accordance with a second predetermined code set until a pulse signal having a negative direct current component is generated and the conversion again carried out in accordance with the first code set. The incoming signal is divided into words of K bits per word, which are then converted into $\gamma$ symbol words where the ratio $K/\gamma$ is greater than 1 and each symbol has N possible levels and the $2^K$ possible binary words are less in number than the $N^\gamma$ possible N level words. Since $2^K$ possible binary words are less than $N^\gamma$ possible N level words, selection of multilevel words is possible such that the resulting signal has no direct current component and a long train of spaces cannot be transmitted. In addition, since the ratio $K/\gamma$ is greater than unity, each symbol of the resulting N bit pulse train carries the information of more than one bit of the original binary pulse train, and as a result less bandwidth is required in order to transmit the resulting signal.

More specifically, in accordance with this invention the incoming pulse signal is divided into words K bits long which are then encoded into an N level code word $\gamma$ symbols long for transmission by either of two code sets (which are interleaved as described below) in accordance with the following rules.

(1) $2^K$ possible binary words must be less in number than $N^\gamma$ possible N level words so that a selection of $\gamma$ symbol words having N direct current levels and with a restricted number of consecutive "0's" or spaces can be made.

(2) Select all N level words whose direct current level is zero. With the exception of an N level word which contains all zeros, these words are assigned to represent Q (N even) or $Q-1$ (N odd) of the $2^K$ binary words.

(3) The remaining N level words are then grouped in pairs whose arithmetic sums, symbol for symbol, are zero. These pairs of words are assigned to represent each of the remaining binary words.

(4) All the N level words assigned in accordance with the above rules are placed in two code sets in accordance with the following rules:

(a) Those N level words having a zero direct current level are placed in both code sets, one of which is called code set + and the other code set —.

(b) Those N level words having a positive direct current level are placed in the code set +.

(c) Those N level words which have a negative direct current level are placed in the code set —.

(5) When the direct current level of the transmitted N level signal is positive, code set — is used.

(6) When the direct current level of the transmitted N level signal is negative or zero, code set + is used.

Thus, for example, where the incoming pulse signal is divided into words of four bits each ($K=4$) and encoded into two bit words ($\gamma=2$) having six possible levels ($N=6$) the resulting code sets are as shown below in Table 1 where the levels are +5, +3, +1, −1, −3, −5. Since the incoming binary pulse signal is divided into binary words of four bits each, there are $2^4=16$ possible binary words. These words are converted into six level words of two symbols each, using only twenty-six of the possible thirty-six words, which are arranged in accordance with the above rules so that the alternating current level of the resulting pulse train is zero and a train of consecutive spaces cannot be transmitted. The remaining ten code words are not used. In addition, for this code, each symbol of the resulting code represents two binary bits of the original pulse train, and as a result bandwidth requirements on the transmission system are reduced.

TABLE 1

[Code: K=4, N=6, $\gamma$=2]

| Binary Words | Code Set + | Code Set − |
|---|---|---|
| 0000 | −5, +5 | −5, +5 |
| 0001 | +1, +3 | −1, −3 |
| 0010 | +3, +1 | −3, −1 |
| 0011 | +3, −1 | −3, +1 |
| 0100 | −1, +3 | +1, −3 |
| 0101 | −3, +3 | −3, +3 |
| 0110 | −1, +5 | +1, −5 |
| 0111 | −1, +1 | −1, +1 |
| 1000 | +1, −1 | +1, −1 |
| 1001 | −3, +5 | +2, −5 |
| 1010 | +3, −3 | +3, −3 |
| 1011 | +5, −3 | −5, +3 |
| 1100 | +5, −1 | −5, +1 |
| 1101 | +5, +1 | −5, −1 |
| 1110 | +5, +3 | −5, −3 |
| 1111 | +5, −5 | +5, −5 |

Unused words: +5 +5, −5 −5, +3 +5, −3 −5, +3 +3, −3 −3, +1 +5, −1 −5, +1 +1, −1 −1.

To accomplish this conversion from binary to N level code the binary input signal is first divided into successive K bit words which are then converted into N level code in accordance with code set +. When an N level code word the algebraic sum of the amplitude of whose bits is positive is generated, the equipment after generating the N level code word switches over to convert the binary words to N level words in accordance with code set —. The generation of N level codes in accordance with code set — continues until the direct current level of the transmitted signal is negative, whereupon conversion is again accomplished by using code set +. Because switching from one code set to the other is done in this manner the resulting output signal has no direct current component and no drift to make regeneration difficult. In addition, and most important to the transmission of digital information over a transmission system employing self-timed repeaters, is the fact that the resulting pulse train cannot contain a train of consecutive zeros. Finally, since K is less than $\gamma$ each symbol of the N level code represents more than one symbol of the binary code, which reduces the bandwidth for transmission.

This invention will be fully comprehended from the following detailed description taken in conjunction with the following drawings, in which:

FIGS. 1 and 2, taken together with FIG. 1 placed to the left of FIG. 2, are a block diagram of the transmitting terminal of a transmission system embodying this invention;

FIGS. 3, 4, and 5, taken together with FIG. 3 placed to the left of FIG. 4 and FIG. 5 to the right of FIG. 4, are a block diagram of the receiving terminal of a transmission system embodying this invention;

Figure 1:
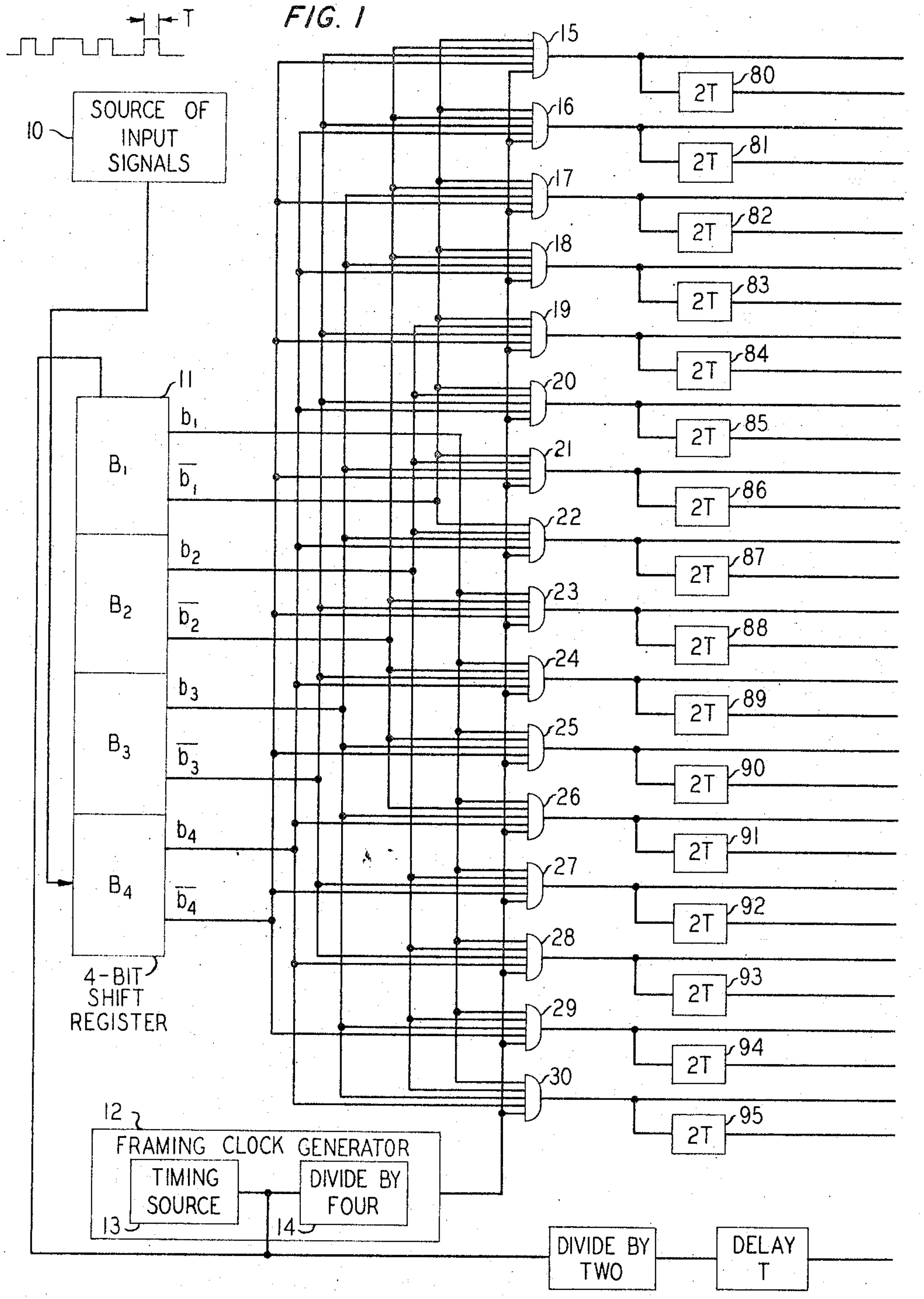
Figure 2:
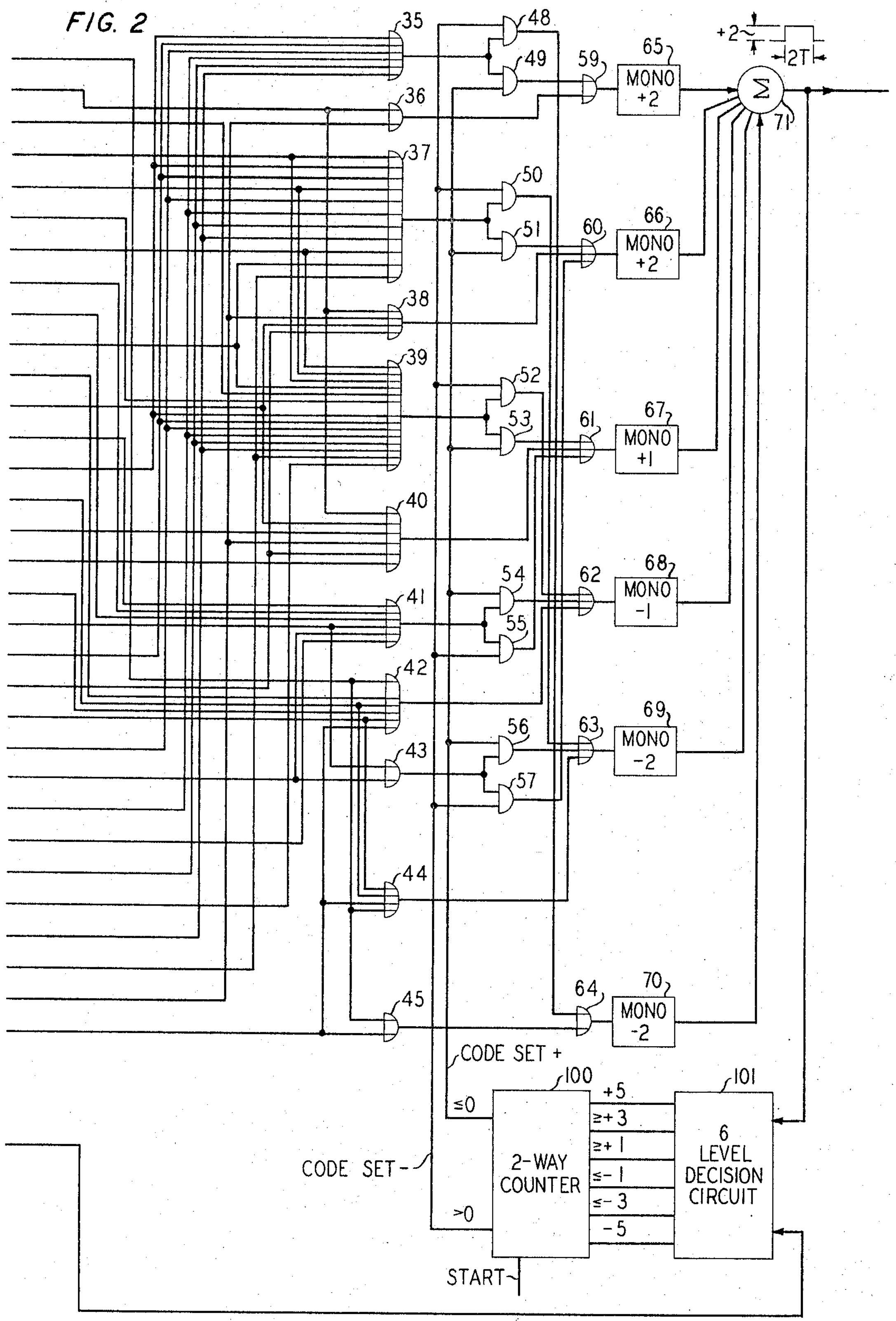

A source 10 of unipolar pulses is connected to the input of the code converter shown in FIGS. 1 and 2. As stated above, the apparatus shown in FIGS. 1 and 2 functions to convert the input signals into six level signals in accordance with the above-recited code. To accomplish this, the incoming signals are first applied to a four-bit shift register 11 which comprises four bistable circuits $B_1$ through $B_4$, each of which has two output terminals. A reference potential is present at one output terminal of a bistable circuit and a ground potential at the other output terminal of the same bistable circuit when the bistable circuit is said to be "set." Under "reset" conditions the potentials at the output terminals are reversed.

The four-bit shift register 11 operates in conjunction with a framing clock generator 12 to divide the input signals into words of four bits each. The frame clock generator comprises a clock signal source 13 and a divider circuit 14, which divides by four. The clock signal source 13 is found at each terminal of a regenerative pulse transmission system such as that disclosed in the above-mentioned Patent 2,996,578, and by C. G. Davis on pages 1 through 24 of the Jan. 1962 issue of the Bell System Technical Journal. Since the clock signal source 13 is connected to divider 14 the output of divider 14 consists of a pulse in every fourth time slot, and this output is applied to one input terminal of each of a sereis of transmission gates 15 through 30 to enable these transmission gates during every fourth time slot.

The output terminals from each bistable circuit of register 11 are connected to the input terminals of predetermined ones of the AND gates 15 through 30. Each bistable circuit $B_1$ through $B_4$ of register 11 has two output terminals each designated by a lower case letter $b$ and a subscript corresponding to that bistable circuit. A bar above any such designation, e.g., $\bar{b}_4$, indicates that at that output terminal a ground potential will be present when a "mark" is stored in its associated bistable circuit. Lack of a bar above the lower case $b$ indicates that a reference voltage will be present under such conditions. When a space is stored in one of the circuits $B_1$ through $B_4$, the voltage conditions are then reversed.

For example, the output terminal $b_1$ of the first of the bistable circuits is connected to one input terminal of AND gates 23, 24, 25, 26, 27, 28, 29, and 30. As a result, when the first bistable circuit $B_1$ in the four-bit register 11 is set, a reference voltage appears at terminal $b_1$ and is applied to those gates. If the first bistable circuit were in a reset condition then ground potential would appear at output terminal $b_1$ and a reference potential at output terminal $\bar{b}_1$. Similar connections are provided for each of the other output terminals and as a result of these connections in response to each of sixteen possible input words, and a coincident pulse from framing clock generator 12, one of the AND gates 15 through 30 generates an output signal, and this output signal is in turn used to generate the predetermined six level code in accordance with the code recited above. For example, for the binary word 1010, AND gate 25 is actuated by the reference voltages present at terminals $b_1$, $\bar{b}_2$, $b_3$, and $\bar{b}_4$ coincident with the clock pulse from framing clock generator 12 and the output signal from AND gate 25 is in turn used to actuate OR gates 38 and 40 of a series of OR gates 35 through 45, whose inputs are connected to receive the output signals from the AND gates as well as delayed replicas of these outputs.

Additional logic circuitry necessary to accomplish the encoding function is provided by a series of ten AND gates 48 through 57 and six OR gates 59 through 64. AND gates 48 through 57 are connected to receive the output signals from OR gates 35, 37, 39, 41, 43, while OR gates 60 through 64 are connected to receive the output signals from AND gates 48 through 57 and OR gates 36, 38, 40, 42, 44, and 45. OR gates 59 through 64 actuate one or more of a series of monostable circuits 65 through 70 which generate output pulses whose levels are +2 units for monostable circuits 65 and 66, +1 unit for monostable circuit 67, −1 unit for monostable circuit 68, and −2 units for monostable circuits 69 and 70. The duration of the output pulses from all monostable circuits is two binary pulse time slots, corresponding to one multilevel itme slot.

To continue the example of the operation of the circuit for the input word 1010, upon the actuation of AND gate 25 by the presence of a binary word 1010, OR gates 38 and 40 are actuated immediately after the occurrence of the pulse from framing clock generator 12. The output signals from OR gates 38 and 40 are applied to OR gates 60 and 61, respectively, so that monostable circuits 66 and 67 are actuated, and their output signals combine at a summing circuit 71 to produce an output level to be applied to the transmission system of +3 units amplitude for one six level pulse time slot. The output signal from AND gate 25 is also delayed by two time slots of the input signal by delay circuit 90, which is one of a series of delay circuits 80 through 95 connected to receive the output signals from AND gates 15 through 30, respectively. The output signal from delay circuit 90 is in turn applied to OR gates 42 and 44 whose output signals trigger OR gates 62 and 63, respectively, so that monostable circuits 68 and 69 are actuated during the second time slot of the multilevel code so that a signal of −3 units of amplitude is generated at the output of the summing circuit 71 at that time. Thus, in accordance with the above code, the unipolar input signals from source 10 are first divided into words of four bits each and encoded in accordance with code set +.

All balanced six level code words are generated in a similar manner to that described above, and it should be noted that the logic circuitry for accomplishing that coding does not make use of any of the AND gates 48 through 57. AND gates 48 through 57 function solely to accomplish the encoding of unbalanced six level words, that is, words whose direct current level is not zero. For example, for the input word 0100, transmission gate 19 is actuated which actuates OR gate 41 which in turn enables both AND gates 54 and 55. AND gates 54 and 55 each have two input terminals. One input terminal of AND gate 54 is connected to the so-called code set + output of two-way counter 100, whose structure will be described below. Similarly, one input terminal of AND gate 55 is connected to the so-called code set − output terminal of two-way counter 100. For present purposes of explanation, it is sufficient to recite that the two-way counter 100 produces a reference voltage at its code set + output terminal and a ground potential at its code set − terminal whenever encoding is to take place in accordance with that code set +. Since initially encoding takes place in accordance with code set +, AND gate 54 produces an output signal in response to the output signal from OR gate 41, and this output signal actuates OR gate 62 to enable monostable circuit 68 which in turn produces a −1 unit output voltage during the first time slot of the output signal as required by code set + in the above table.

The output signal from transmission gate 19 is also delayed by two time slots of the input signal by delay circuit 84, one of a series of delay circuits 80 through 95 each of which is connected to the output of a one of gates 15 through 30, respectively, and applied to OR gates 37 and 39 so that AND gates 51 and 53 are enabled to cause monostable circuits 66 and 67 to generate a combined signal of +3 units amplitude during the second time slot of the output signal at the output terminal of summing circuit 71.

As a result of the generation of an unbalanced six level code, that is, one having a direct current component (+2 units of unbalance in this case), a six level decision circuit 101, to be described below, is actuated and which produces at one of its six output terminals a signal indicative of the magnitude of the direct current level of the output signal from adder 71. Three output terminals are provided which indicate that the output signal from summing circuit 71 has an amplitude of $\geq +1$, $\geq +3$, and +5 units, respectively, and these output terminals are so denoted in FIG. 2. In addition, three other output terminals are provided which indicate that the direct current level of the output signal from summing circuit 71 is a negative voltage of $\leq -1$, $\leq -3$, or −5 units and those output terminals are similarly marked in FIG. 2. Whenever an output signal appears at one or more of the output terminals, that is, +5, $\geq +3$, $\geq +1$, $\leq -1$, $\leq -3$, −5, the two-way counter 100 is caused to increment its count by +5, +3, +1, −1, −3, −5, in accordance with circuits internal to two-way counter 100, to be described below. Thus, as a result of the generation of the two level signal −1, +3 in accordance with code set + for the binary word 0100, and the assumption that two-way counter 100 starts with a zero count, the two-way counter is incremented twice, once by −1 and then by +3 for a net change of +2 leading to a count of +2, to produce a reference voltage at its code set − output terminal which in turn actuates AND gates 46, 50, 52, 55, and 75 while AND gates 49, 51, 53, 54, and 56 are disabled. As a result, the next binary code word to be encoded will now be encoded in accordance with code set −.

For example, suppose the next binary word is the code word 1011. This is to be encoded in accordance with code set − as −5, +3, and this is accomplished in the following manner. The binary word 1011 causes AND gate 26 to be actuated, which in turn actuates OR gates 35, 37, and 39 whose output signals in turn actuate AND gates 48, 50, and 52, since these AND gates have been enabled by the reference voltage at the code set — output terminal of two-way counter 100. The output signal from AND gate 48 actuates OR gate 64 which in turn actuates monostable circuit 70 to produce an output signal of —2 units for one six level output time slot. Similarly, AND gate 50 actuates OR gate 63 to actuate monostable circuit 69 to produce an output signal of —2 units amplitude. Finally, the output from AND gate 52 enables OR gate 62 which causes monostable circuit 68 to produce an output of —1 unit of amplitude. The output signals from monostable circuits 68, 69, and 70 are added together by summing circuit 71 to produce an output signal of —5 units during the first time slot of the six level code in accordance with the above-recited code sets.

The output signal from transmission gate 26 is also delayed two time slots by delay circuit 91 and applied to OR gates 41 and 43 whose output signals actuate AND gates 55 and 57, respectively, since these AND gates have been enabled by the reference voltage at the code set — output terminal of two-way counter 100. The output signal from AND gate 55 actuates OR gate 61 which in turn causes monostable circuit 67 to generate an output signal of +1 unit amplitude. Similarly, the output signal from AND gate 57 actuates OR gate 60 which causes monostable circuit 66 to generate an output signal of +2 units amplitude. The output signals from monostable circuits 66 and 67 are combined by summing circuit 71 to produce an output signal of +3 units during the second time slot of the six level code in accordance with the above-recited code sets.

Thus, in accordance with this invention the binary signal is first divided into successive K bit words, in our example $K=4$, which are then converted into N level code words, in our illustration, for example, $N=6$, in accordance with code set +. When an N level code the algebraic sum of the amplitude of whose symbols is positive is generated, the equipment after generating the N level code words switches over to convert the binary words to N level words in accordance with code set —. The generation of N level codes in accordance with code set — continues until the direct current level of the transmitted signal is negative whereby conversion is again accomplished in accordance with code set +. Since switching from one code set to the other is done in this manner the resulting output signal has no direct current component and thus there is no drift to make regeneration difficult. In addition, transmission of digital information over such a transmission system facilitates the use of self-timed repeaters since the codes are composed in accordance with the above-recited rules so that the resulting pulse train cannot contain a train of consecutive zeros sufficient to render self-timed repeaters inoperative. Finally since K, the number of bits per word into which the binary signal is divided, is less than $\gamma$, the number of resulting symbols in the N level code, each symbol of the N level code represents more than one bit of the binary code, reducing the bandwidth requirements of the transmission system.

Figure 3:
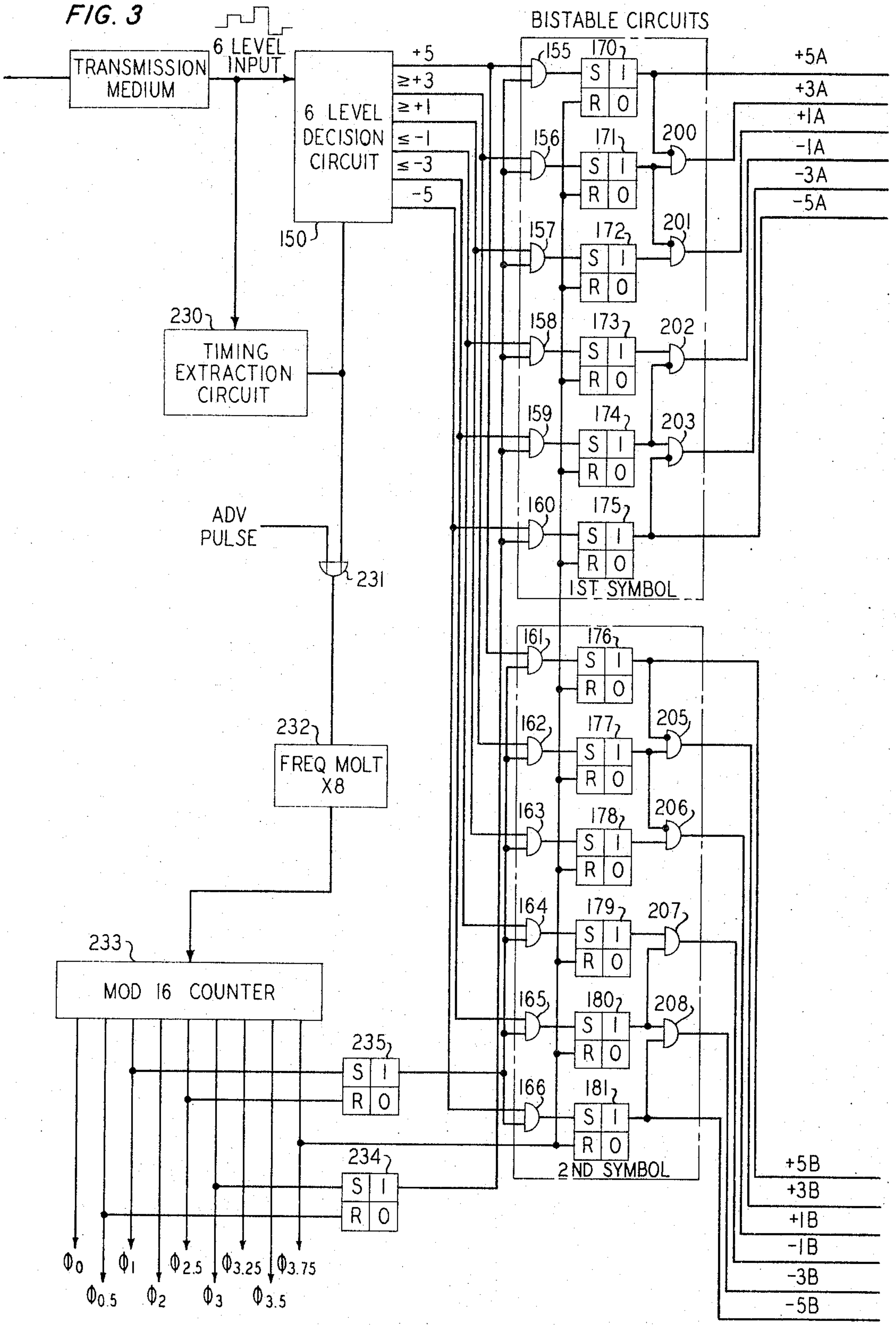
Figure 4:
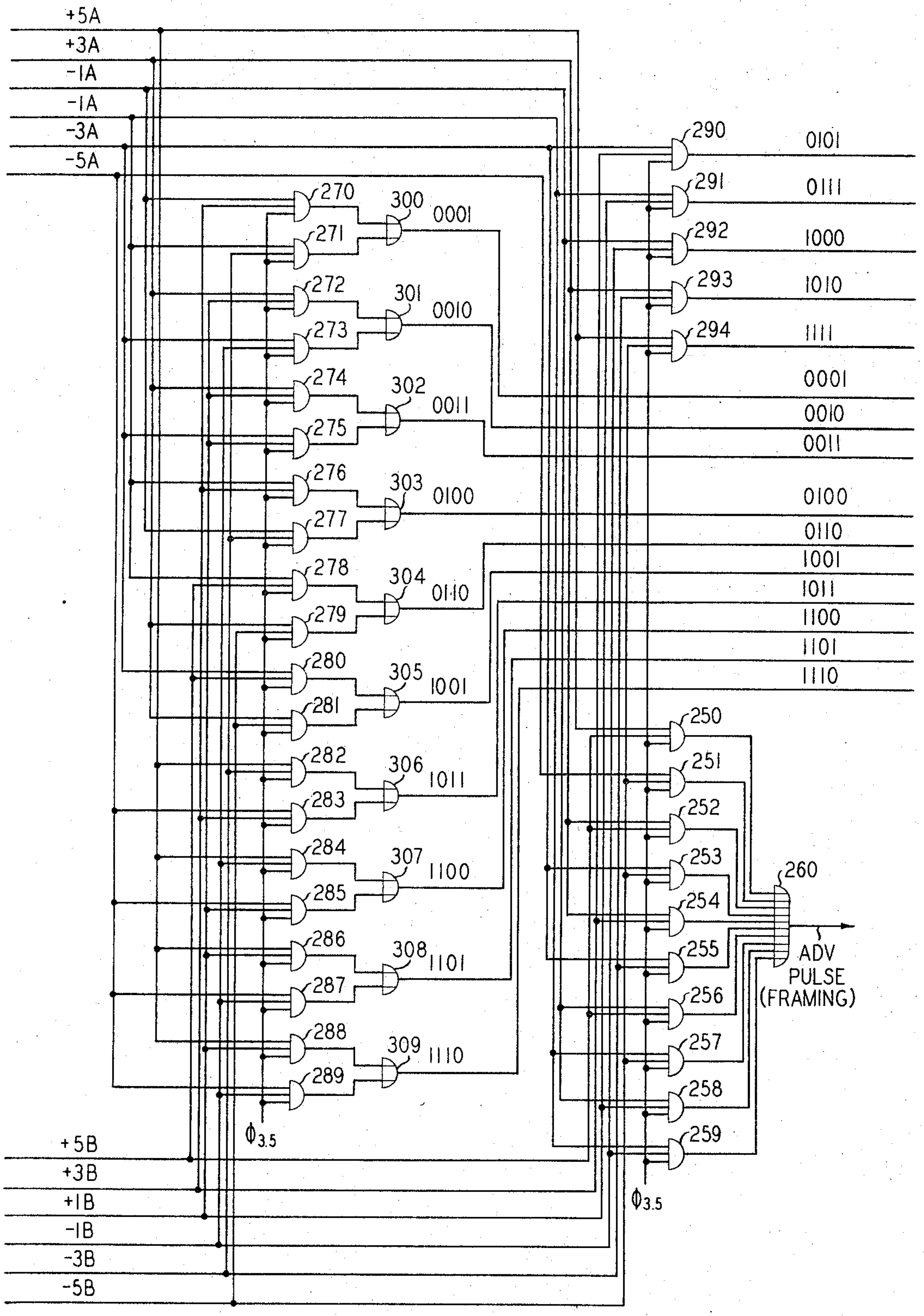
Figure 5:
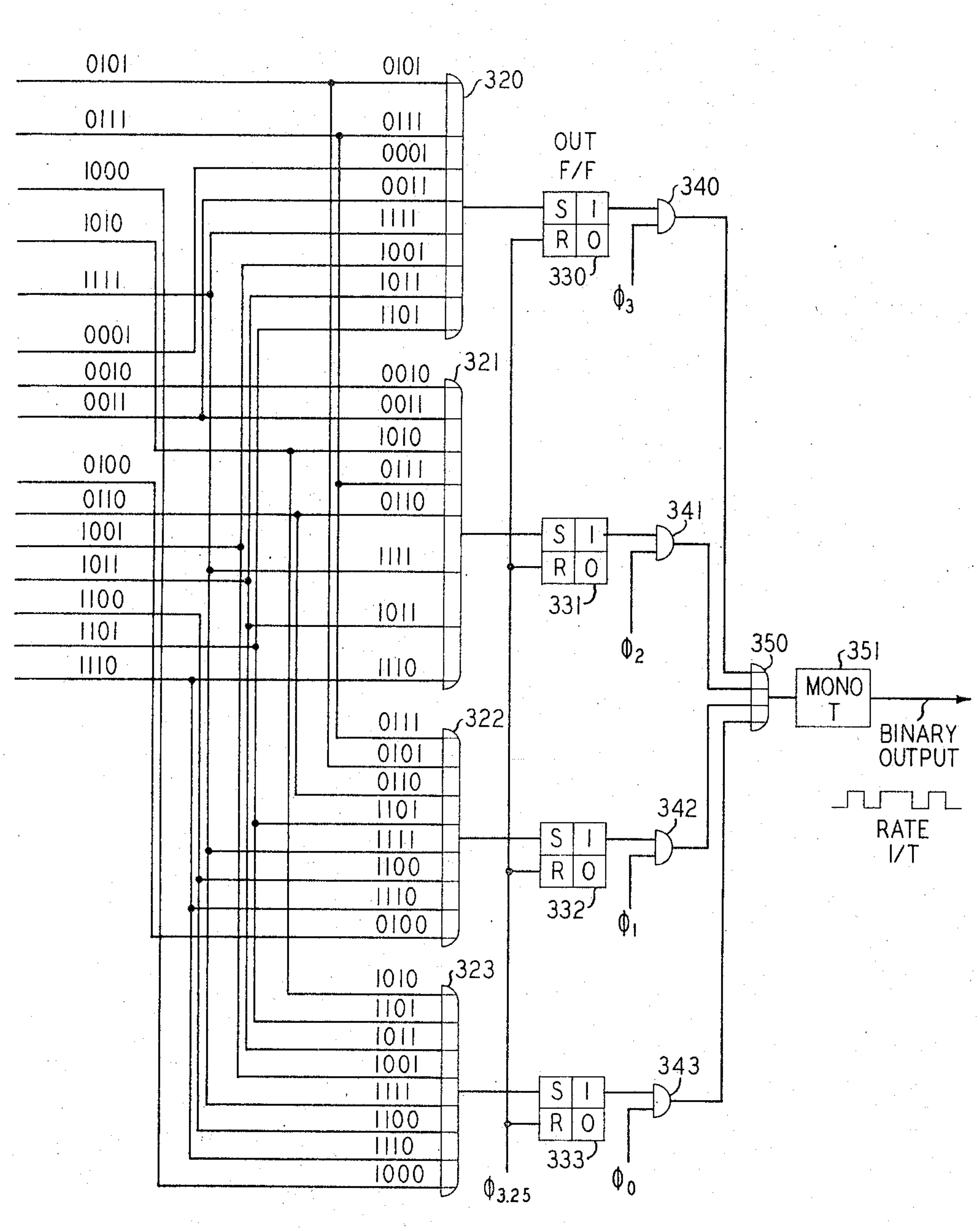
Figure 6:
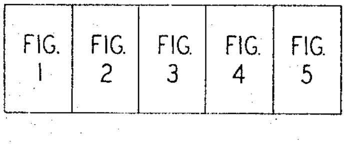
FIG. 6 shows the arrangement of FIGS. 1 through 5 to form a complete block diagram of a transmission system embodying this invention.

The receiving terminal is shown in FIGS. 3, 4, and 5 with those figures arranged as shown in FIG. 6. The output signal from the transmission system is applied to a six level decision circuit 150, to be described in detail below, which has six output terminals. Three of the output terminals of decision circuit 150 denote whether the level of the received signal is equal to or greater than +1 unit amplitude, equal to or greater than +3 units amplitude, or greater than +5 units amplitude, respectively, so that, for example, when the input signal is of +5 units amplitude, a reference voltage appears at all of the above three mentioned output terminals. Similarly, there are three output terminals to indicate the level of a negative signal at the output of the transmission medium, and these are denoted as being equal to or less than —1, —3, or less than —5, respectively. When the input signal is —5 units in amplitude, all three of these latter output terminals have a reference voltage thereon while if the input signal is —3 units in amplitude only the first two have a reference voltage placed thereon.

The output signals from six level decision circuit 150 are applied to two groups of AND gates, one of which comprises AND gates 155 through 160, and the second of which comprises AND gates 161 through 166. Each output terminal of the six level decision circuit 150 is connected to one input terminal of one AND gate in each group. Thus, for example, the +5 output terminal is connected to one input terminal of AND gate 155 and to one input terminal of AND gate 161. The other output terminals of the six level decision circuit are connected in a similar manner. Each AND gate has its output terminal connected to the set input terminal of a bistable circuit, and there are two groups of these bistable circuits, corresponding to the two groups of AND gates. The first group of bistable circuits comprises bistable circuits 170 through 175, while the second group comprises bistable circuits 176 through 181.

AND gates 155 through 160 are enabled during the first of the two time slots of each word of the six level signal, and logic circuitry comprising inhibit gates 200 through 203 connected to the "1" output terminals of bistable circuits 170 through 175 function to unambiguously denote the level of the output signal. Thus, the "1" output terminal of bistable circuit 170 may be denoted a +5*a* output terminal as shown in FIGS. 3 and 4, this notation denoting that a reference voltage at that output terminal indicates a received signal level in the first (or *a*) time slot of the two symbol received word having a positive amplitude of +5 units. The "1" output terminal bistable circuit 170 also inhibits inhibit gate 200 so that the reference voltage at the "1" output terminal of bistable circuit 171 applied to inhibit gate 200 does not produce an output signal at the +3*a* output terminal, in the event that the received signal is +5 units. Similarly, the reference voltage at the "1" output terminal of bistable circuit 171 inhibits the output of gate 201. Thus, when the input signal is +5 units in the first time slot, a reference pulse appears only at the +5*a* output terminal. If the input signal had been +3 units in amplitude, during the first time slot, then inhibit gate 200 would produce a reference voltage at the +3*a* output terminal, while at the same time inhibiting the output of inhibit gate 201 so that no signal is applied to the +1*a* output terminal. As a result the level of the input signal is uniquely defined. Similar connections are made to inhibit gates 202 and 203 from the "1" output terminals of bistable circuits 173, 174, and 175 so that a reference voltage at either terminals —1*a*, —3*a*, and —5*a* clearly defines whether the signal is equal to —1 units in amplitude, —3 units in amplitude, or —5 units in amplitude.

Similar logic circuitry is provided at the output terminals of bistable circuits 176 through 181 by inhibit gates 205, 206, 207, and 208 so that the level of the received signal during the second time slot of each two symbol six level word is accurately defined by the reference voltage at a single one of the output terminals denoted +1*b*, +3*b*, +5*b*, or —1*b*, —3*b*, —5*b*.

The operation of the conversion apparatus at the receiving terminal shown in FIGS. 3, 4, and 5 is dependent on timing information for its operation. A timing extraction circuit 230 generates pulses at the pulse repetition rate of the six level transmitted signal. The extraction circuit itself may comprise a tuned resonant circuit, which is caused to oscillate by the transmitted signal at the pulse repetition rate thereof as described in United States Patent 2,996,578, which issued to F. T. Andrews, Jr., on August 15, 1961, whose output is connected to a pulse generator circuit. The output of the timing extraction circuit 230 is applied to the six level decision circuit to cause it to read the level of each symbol of the received signal and is also applied through an OR gate 231 to a frequency multiplier circuit 232 which multiplies the repetition rate of the derived timing pulses by eight. Since the pulse repetition rate of the transmitted six level signal is one-half the repetition rate of the original pulses from source 10, the output of frequency multiplier 232 comprises pulses whose repetition rate is four times the rate of the pulses from source 10. As a result, frequency multiplier 232 produces four output pulses during the transmission of a two symbol six level word, and these pulses are applied to a modulo 16 counter 233. A modulo 16 counter, as is well known in the art, is a counter which has sixteen output terminals at which output pulses sequentially appear in response to input pulses. After every sixteenth input pulse the cycle of counting is repeated with an output pulse at the first of the output terminals.

Figure 7:
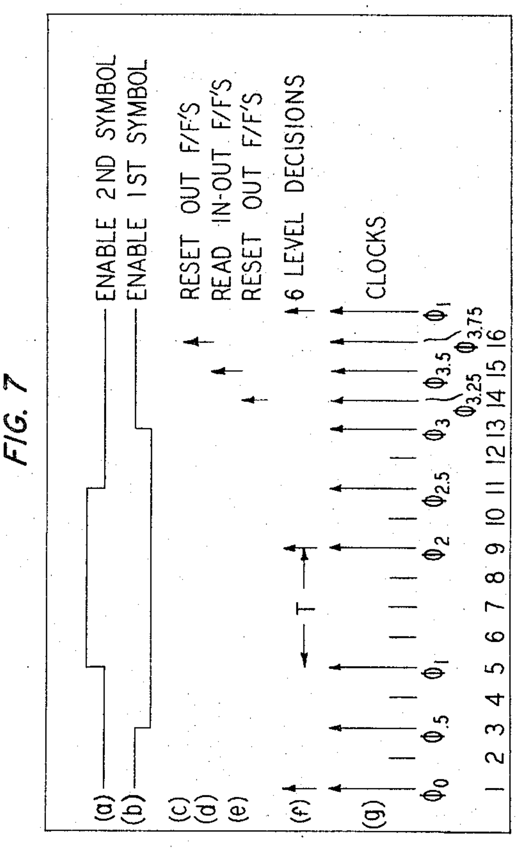
FIG. 7 shows the timing signals generated at the receiving terminal shown in FIGS. 3, 4, and 5.

The sixteen output terminals are not shown in the drawing, which shows only the first, third, fifth, ninth, eleventh, thirteenth, fourteenth, fifteenth, and sixteenth. The sixteen output signals from the modulo counter occur at times designated $\phi 1$ through $\phi 3.75$ as shown in line *g* of FIG. 7. During the time between the thirteenth through the sixteenth and continuing until the nineteenth or second output pulse of the second cycle of the modulo 16 counter, bistable circuit 234 is in its set condition to enable AND gates 155 through 160 to pass the first symbol. The resulting enabling signal from bistable circuit 234 is shown in line *b* of FIG. 7. Similarly, during the timing interval shown in line *a* of FIG. 7 between the fifth and eleventh output pulses from modulo 16 counter 233, bistable circuit 235 is in its set condition so that AND gates 161 through 166 are actuated to pass the second symbol of each word.

Actually when the apparatus is first turned on there may be an initial decoding error due to the fact that bistable circuits 234 and 235 are not actuated during the first and second time slots of each six level word. In other words, the system may initially be out of frame. This is easily corrected, however, by the application of an ADVANCE pulse to OR gate 231 which serves to generate an additional eight pulses at the output of frequency multiplier 232 to advance modulo 16 counter by one time slot of the six level signal and thereby place the apparatus in frame. The ADVANCE pulse itself is generated as will be described below by detecting the presence of words which are not present in either of the code sets in the above table. For example, should the word +5, +5, or −5, −5, or any of the other unused words shown in the code table above, be detected by the apparatus comprising AND gates 250 through 259 whose operation is to be described below, then an ADVANCE pulse is generated by OR gate 260 to place the apparatus in frame.

A series of twenty-five AND gates 270 through 294, respectively, each having three input terminals, are provided so that the signals from bistable circuits 170 and 175 and inhibit gates 200 through 203, representing the first symbol of a transmitted word, and the signals from bistable circuits 176 and 181, and inhibit gates 205 through 208 representing the second symbol, may be used to produce output signals to generate the decoded binary input signal. For example, the AND gate 270 is connected to the +1*a* output terminal of inhibit gate 201 and is also connected to receive the signals from the +3*b* output terminal of inhibit gate 205. Thus, for the transmitted signal +1, +3, AND gate 270 generates an output signal which is applied through OR gate 300 to additional circuitry shown in FIG. 6 which will generate the output signal 0001 corresponding to the transmitted word +1, +3. Gates 271 through 289 operate in a similar manner. Thus, AND gate 271 is connected to the −1*a* and −3*b* output terminals. As a result, in accordance with code set −, AND gate 271 generates an output signal corresponding to the word 0001 for the input signal −1, −3. Thus, AND gates 270 through 289 function to decode the unbalanced words in both code sets.

AND gates 290 through 294 function in a similar manner but are limited to the decoding of the balanced transmitted code words in both code set + and code set −. Thus, for example, AND gate 290 produces an output signal whenever the code word −3, +3 is transmitted. This transmitted word corresponds to the binary word 0101 in either code set + or code set −, and the output signal from AND gate 290 is used to activate the circuitry shown in FIG. 6 to produce this output signal.

The output signals from each of the AND gates 270 through 289 are applied to one of a group of OR gates 300 through 309 whose output signals, together with the output signals from AND gates 290 through 294, are applied to a group of four OR gates 320 through 323, each of which functions to properly set one of a group of four bistable circuits 330 and 333. The output signals, clocked at predetermined times, as explained below, through AND gates 340 through 343, are used to generate the pulse output word. Thus, for example, the output signal from AND gate 290 is applied to one input terminal of OR gate 320 and, also, to one input terminal of OR gate 322. As a result of the transmission of the six level word −3, +3, OR gates 320 and 322 produce output signals which set bistable circuits 330 and 332. The voltages present at the "1" output terminal of the bistable circuits 330 through 333 are then sequentially sampled at the repetition rate of the binary output signal with bistable circuit 333 being sampled first, bistable circuit 332 being sampled second, and so forth. Since in this example bistable circuits 330 and 332 are in the set condition and bistable circuits 331 and 333 are in the reset condition, the sequential sampling of these circuits produces an output signal of the pattern 0101.

The timing of the entire conversion process is determined by the output signals from the modulo 16 counter 233 driven by the timing extraction circuit 230 through OR gate 231 and frequency multiplier 232. Thus, the six level decision circuit 150 is read out at times $\phi_0$ and $\phi_2$ as shown in line *f* of FIG. 7. As a result, bistable circuits 170 through 175 and inhibit gates 200 through 203 produce a signal indicative of the first symbol at time $\phi_0$, and the output signal from bistable circuits 176 through 181 and and inhibit gates 205 through 208 produce a signal indicative of the second symbol at time $\phi_2$.

AND gates 270 through 294 are actuated at time $\phi_{3.5}$ after both the first and the second symbols have been stored in bistable circuits 170 through 181. The signals from AND gates 270 through 289, passed through OR gates 300 through 309, and the signals from AND gates 290 through 294, are immediately used to set bistable circuits 300 through 333. At time $\phi_{3.75}$, the next count of modulo 16 counter 233, bistable circuits 170 through 181 are reset to allow storage of the code word transmitted in the next two time slots of the transmitted signal. The output signals from bistable circuits 330 through 333 are read out under the control of AND gates 343, 342, 341, and 340, which are sequentially enabled at times $\phi_0$, $\phi_1$, $\phi_2$, and $\phi_3$. The output terminals of AND gates 340 through 343 are connected to OR gate 350 which sequentially actuates a monostable circuit 351, which generates a binary pulse one binary time slot long, to produce the binary output signal.

As stated above, it is necessary for the apparatus to be in frame in order to accomplish the proper conversion of six level two symbol input words into four-bit binary output signals. Whenever the apparatus is not in frame words will be detected as being received from the transmission medium which do not appear in the code. Thus, for example, the word +5, +5 should not be received and if its presence is indicated it serves to indicate to the receiving terminal that it is out of frame and that a correction must be made by advancing modulo 16 counter 233. Thus, for the word +5, +5 AND gate 250 is enabled so that OR gate 260 generates an output pulse. This pulse is used to advance modulo 16 counter 233 eight counts through OR gate 231 and frequency multiplier 232.

Figure 8A:
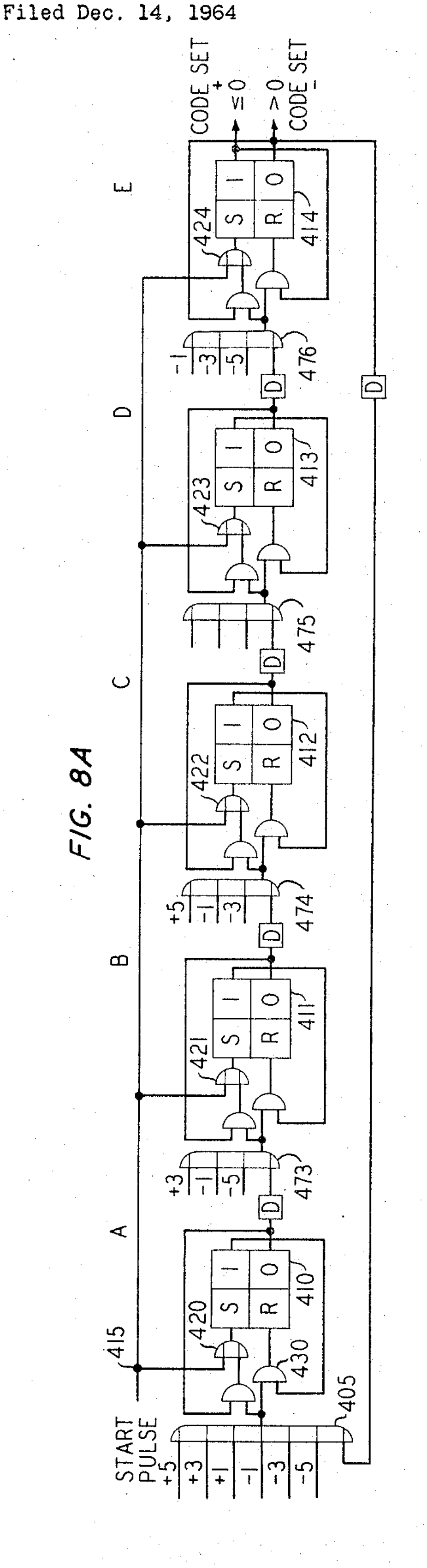
FIGS. 8A and 8B are schematic diagrams of the so-called six level decision circuit shown in FIGS. 2 and 3.
Figure 8B:
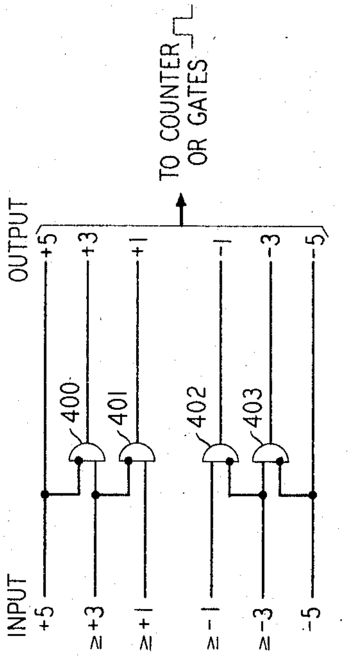

The two-way counter 100 shown is in reality a modified modulo 32 counter with special inputs to each stage as shown in schematic form in FIG. 8*a* preceded by logic circuitry comprising inhibit gates 400 through 403 as shown in FIG. 8*b*. As shown in FIG. 2, the input signal to the two-way counter consists of the output signals from six level decision circuit 101. The output signals from six level decision circuit 101 do not clearly define the levels of the transmitted symbols. Thus, for example, if the transmitted signal is +5 units in amplitude, then not only does a reference pulse appear at the +5 output terminal but in addition it appears at the ≧+3 and ≧+1 output terminals of the six level decision circuit. The logic circuitry comprising inhibit gates 400 through 403 as shown in FIG. 8*b* functions to remove this ambiguity. The +5 output terminal and the −5 output terminal in themselves present no ambiguity so there is a direct connection between the input and the output of the +5 and −5 output terminals of FIG. 8*b*. Each of the other input terminals, that is, ≥+3, ≥+1, ≦−1, and ≦−3, are connected to the input terminal of a one of inhibit gates 400 through 403, respectively. Inhibit gate 400 is inhibited by a signal present at the +5 input terminal, while inhibit gate 401 is inhibited by a signal present at the ≧+3 input terminal. Thus, should the input signal be +3 units of amplitude, inhibit gate 401 is inhibited from producing an output signal, and the only output signal present appears at the +3 output terminal of the logic circuitry. Similarly, if the input signal is +5 units in amplitude, inhibit gates 400 and 401 will be inhibited and the only output signal will appear at the +5 output terminal. Similar logic applies to the circuitry comprising inhibit gates 402 and 403, and as a result only one output signal is present at the output terminals of the logic circuitry shown in FIG. 8*b* for each symbol of the input signal.

The output terminals of the logic circuitry shown in in FIG. 8*b* are applied to OR gates 405 and 473 through 476 of the modified modulo 32 counter shown in FIG. 8*a*. The counter comprises five bistable circuits 410 through 414 which are initially placed in a set condition by a start pulse, generated when the equipment is first turned on, present on input line 415 which actuates OR gates 420 through 424, each of whose output terminal is connected to set bistable circuits 410 through 414, respectively. Thus, a "1" appears at the "1" output terminal of bistable circuits 410 through 414. This starting condition represents a zero count. The output of the two-way counter is taken from bistable circuit 414. A reference voltage at the "1" output terminal of bistable circuit 414 indicates to the apparatus to which the two-way counter is connected that encoding is to take place in accordance with code set +. Conversely, when a reference voltage or a "1" appears at the code set − output terminal of bistable circuit 414 and a ground appears at the code set + output terminal, encoding is to take place in accordance with code set −.

The entire function of the apparatus shown in FIGS. 8*a* and 8*b* is to examine the direct current level of the transmitted signal and to govern the encoding in accordance with whether that direct current level is positive or negative. To accomplish this, the five bistable circuits 410 through 414 are employed to produce a count indicative of the direct current level. Initially, all five bistable circuits 410 through 414 are placed in a set condition, and encoding takes place in accordance with code set +. The set condition of all the bistable circuits is used as a reference level so that whenever the counter counts a direct current level whose binary value contains a "1" in bistable circuit 414, encoding continues in accordance with code set +; and whenever the counter counts a direct current level whose binary value contains a "0" in bistable circuit 414, encoding takes place in accordance with code set −. This is illustrated graphically in the following table wherein the states of bistable circuits 410 through 414 are indicated by a 0 or a 1 to indicate whether they are in the set or reset condition.

| Count or Direct Current Level | Cells | | | | |
|---|---|---|---|---|---|
| | 414 | 413 | 412 | 411 | 410 |
| +13 | 0 | 1 | 1 | 0 | 0 |
| +12 | 0 | 1 | 0 | 1 | 1 |
| +11 | 0 | 1 | 0 | 1 | 0 |
| +10 | 0 | 1 | 0 | 0 | 1 |
| +9 | 0 | 1 | 0 | 0 | 0 |
| +8 | 0 | 0 | 1 | 1 | 1 |
| +7 | 0 | 0 | 1 | 1 | 0 |
| +6 | 0 | 0 | 1 | 0 | 1 |
| +5 | 0 | 0 | 1 | 0 | 0 |
| +4 | 0 | 0 | 0 | 1 | 1 |
| +3 | 0 | 0 | 0 | 1 | 0 |
| +2 | 0 | 0 | 0 | 0 | 1 |
| +1 | 0 | 0 | 0 | 0 | 0 |
| 0 | 1 | 1 | 1 | 1 | 1 |
| −1 | 1 | 1 | 1 | 1 | 0 |
| −2 | 1 | 1 | 1 | 0 | 1 |
| −3 | 1 | 1 | 1 | 0 | 0 |
| −4 | 1 | 1 | 0 | 1 | 1 |
| −5 | 1 | 1 | 0 | 1 | 0 |
| −6 | 1 | 1 | 0 | 0 | 1 |
| −7 | 1 | 1 | 0 | 0 | 0 |
| −8 | 1 | 0 | 1 | 1 | 1 |
| −9 | 1 | 0 | 1 | 1 | 0 |
| −10 | 1 | 0 | 1 | 0 | 1 |
| −11 | 1 | 0 | 1 | 0 | 0 |
| −12 | 1 | 0 | 0 | 1 | 1 |
| −13 | 1 | 0 | 0 | 1 | 0 |

For example, assume a first transmitted signal having a direct current level of +3 units. Since the bistable circuit 410 is initially in the set condition the reference voltage at its output terminal combines with the input signal to actuate AND gate 430 to reset bistable circuit 410. The +3 input signal also serves to reset bistable circuit 411, which is subsequently set by the delayed output signal from the "0" output terminal of bistable circuit 410. The resetting of bistable circuit 411 in turn subsequently causes bistable circuits 412 through 414 to be reset so that for a +3 input, all the bistable circuits save bistable circuit 411 are in the reset condition. The resulting count of the counter is the binary number 00010 which corresponds to a "count" or direct current level of the transmitted signal of +3 since the level 0 results in all bistable circuits being set. Similarly, other input signals cause the bistable circuits to assume the states shown in the above table, but it should be noted that as long as the input signal is positive, at no time does bistable circuit 414 assume the set condition. As a result, encoding always takes place in accordance with code set −. The maximum positive or negative going input signal is one of +13 or −13 units amplitude, and this may be seen by examining the code table shown above. In code set + we have the code word +5, +3, and this generates the maximum possible absolute magnitude six level word which in turn may be followed by the word +5, −5. Since the second word +5, −5 starts with the symbol +5, this may be added to the sum of the symbols of the word +5, +3 to produce a signal having 13 units of amplitude. This total is well below that which may be fed into the two-way counter without disturbing the readings of bistable circuit 414, and bistable circuit 414 will always be reset when the input signal has a positive direct current level and will always be set when the signal has a negative direct current level.

It should be recognized that the two-way counter described above provides a very accurate method of recording the direct current level of the input signal. Less accurate results could be obtained by using an integrating circuit whose output is applied to a Schmitt trigger circuit. The integrating circuit would produce an output signal whose polarity represents the direct current level of the input signal, and this output signal in turn could be used to govern the state of the Schmitt trigger circuit. In practice, however, it may be difficult to ascertain the polarity of the direct current level when it is near zero, and for this reason this integrator-Schmitt trigger circuit arrangement is not particularly desirable where great accuracy is necessary.

Figure 9:
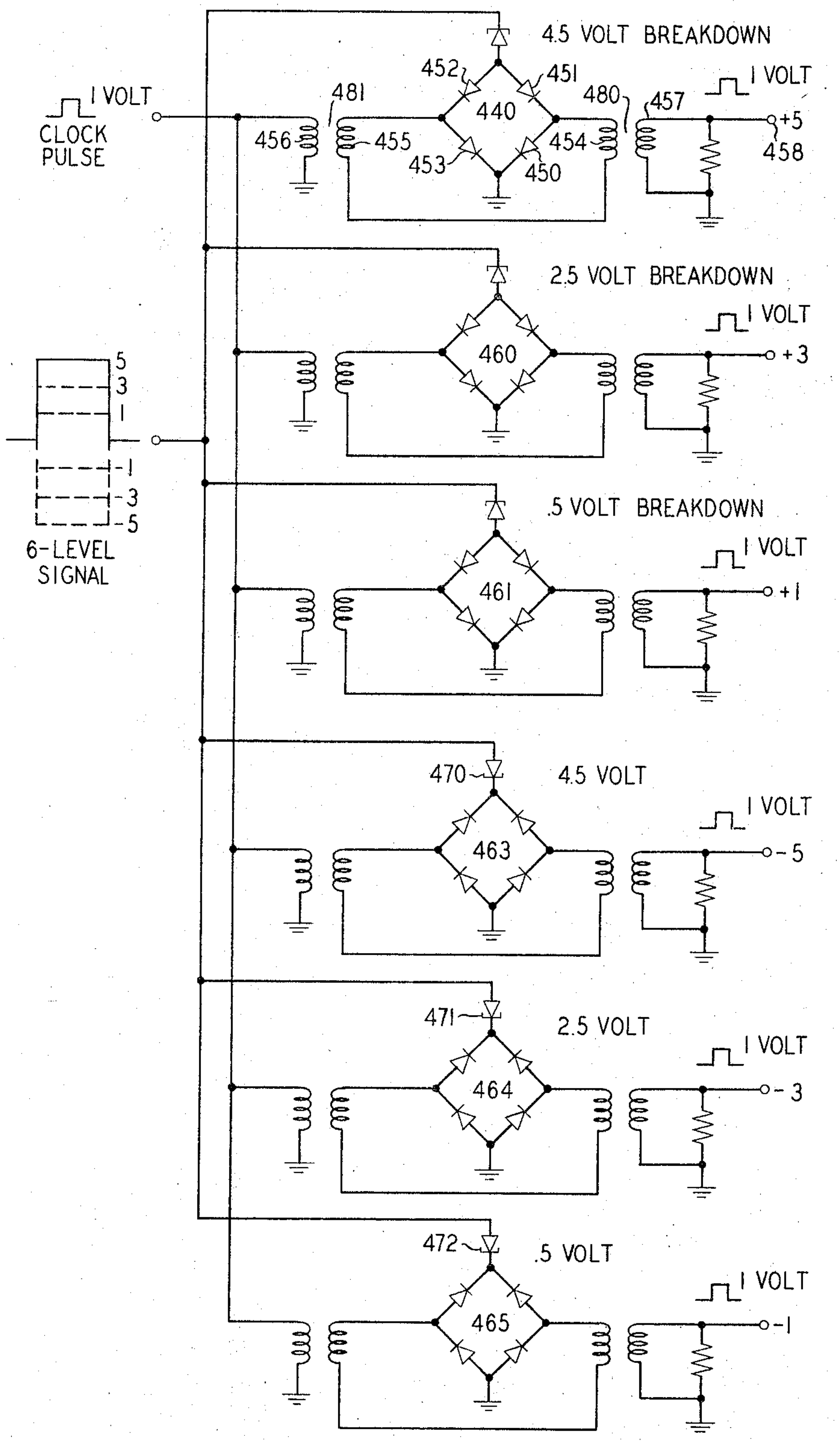
FIG. 9 is a schematic diagram of the two-way counter shown in FIG. 2.

The six level decision circuit shown in FIGS. 2 and 3 is shown in schematic diagram form in FIG. 9. The circuit consists of six gate circuits 440, 460 through 465, each comprising four diodes in a diamond configuration. A one volt clock signal is applied by means of one winding of a transformer across two opposite nodes of the diamond, which are connected together by means of two additional transformer windings. This clock signal is obtained for the decision circuit at the transmitting terminal by dividing the signal from the timing signal source 13 by two, while at the receiving terminal it is obtained from timing extraction circuit 230. When the diodes within the diamond configuration are all conducting, a clock pulse is transmitted from the input winding to the output winding to indicate the level of the input signal.

Since all six circuits within the six level decision circuit are nearly identical, it will suffice to describe only one of them in detail. The uppermost gating circuit 440 in FIG. 9 comprises a diamond configuration of four diodes 450, 451, 452, and 453, with two of the nodes connected by means of two windings 454 and 455 of a pair of transformers 480, 481. The input winding 456 of transformer 481 is connected to receive one volt clock pulses and the output winding 457 of transformer 480 is connected to an output terminal 458. The six level input signal is applied to a Zener diode which breaks down at a voltage of +4.5 volts so that when an input signal greater than +4.5 volts is applied the diode breaks down, causing all four diodes 450 through 453 to conduct, thus transmitting the one volt clock pulse from the input winding 456 to the output terminal 458. In similar fashion for an input signal greater than +4.5 volts, the +2.5 volt and +0.5 volt Zener diodes associated with gating circuits 460 and 461 similarly break down, while for voltages greater than 2.5 volts but less than 4.5 volts, only gates 460 and 461 are conductive. Similarly, if the voltage is greater than 0.5 volt but less than 2.5 volts, only gate 461 conducts.

Gates 463, 464, and 465 operate in a manner similar to that recited above with the exception of the fact that all diodes are poled in the reverse manner from the diodes associated with the operation of the above gates. Thus, when a positive six level signal is applied to the apparatus, one or more of the gates 440, 460, or 461 is conductive, while the diodes associated with gates 463 through 465 are nonconductive. When a negative input signal is applied to the apparatus, the diodes associated with gates 463 through 465 are poled in the forward direction, and depending upon the level of the input signal, one or more of the Zener diodes 470, 471, 472 conducts, allowing the clock pulse to actuate one or more of the output terminals.

Thus, in accordance with this invention regeneration of a PCM signal in the transmission line is facilitated by eliminating drift in the direct current level of the transmitted signal. In addition, the use of self-timed repeaters in the PCM system is made possible due to the fact that the number of possible transmitted consecutive spaces or zeros can be kept sufficiently below that number at which the self-timing apparatus in the repeaters is rendered inoperative. Finally, in accordance with this invention each symbol of a transmitted signal represents at least two symbols of the original binary input signal, resulting in a significant reduction in the bandwidth requirements of the transmission medium.

It is to be understood that the above-described arrangements are illustrative of the application of the principles of the invention. Numerous other arrangements may be devised by those skilled in the art without departing from the spirit and scope of the invention.

What is claimed is:

1. Apparatus for converting binary pulse signals into pulse signals having a plurality of possible signal levels greater than two so that the direct current level of the resulting signal is zero and the number of consecutive spaces is less than a predetermined number comprising, means to divide the binary pulse signal into words of a plurality of bits, means to convert said binary words into pulse signals of a plurality of symbols the ratio of which to the number of bits of said binary words is less than one, with each symbol having a plurality of possible signal levels greater than two in accordance with a first predetermined code until a pulse signal having a positive direct current component is generated, means to convert said binary words into pulse signals of a plurality of symbols the ratio of which to the number of bits of said binary words is less than one, with each symbol having a plurality of possible signal levels greater than two in accordance with a second predetermined code after the generation of a pulse signal having a positive direct current component until a pulse signal is generated having a negative direct current component, whereupon said conversion is again accomplished in accordance with said first code until a pulse signal is generated having a positive direct current component.

2. Apparatus for converting binary pulse signals into pulse signals having six possible signal levels so that the direct current level of the resulting signal is zero and the number of consecutive spaces is less than a predetermined number comprising, means to divide the binary pulse signal into words of four bits, means to convert said four bit words into pulse signals of two symbols each with each symbol having six possible signal levels in accordance with a first predetermined code until a pulse signal having a positive direct current component is generated, means to convert said four bit words into pulse signals of two symbols each with each symbol having six possible signal levels in accordance with a second predetermined code after the generation of a pulse signal having a positive direct current component until a pulse is generated having a negative direct current component, whereupon said conversion is again accomplished in accordance with said first code until a pulse signal is generated having a positive direct current component.

3. Apparatus for converting binary pulse signals into pulse signals having six possible signal levels so that the direct current level of the resulting signal is zero and the number of consecutive spaces is less than a predetermined number comprising, means to divide the binary pulse signal into words of four bits, means to convert said four bit words into pulse signals of two symbols each having six possible signal levels in accordance with the following first code

| Binary word | Code 1 |
|---|---|
| 0000 | −5+5 |
| 0001 | +1+3 |
| 0010 | +3+1 |
| 0011 | +3−1 |
| 0100 | −1+3 |
| 0101 | −3+3 |
| 0110 | −1+5 |
| 0111 | −1+1 |
| 1000 | +1−1 |
| 1001 | −3+5 |
| 1010 | +3−3 |
| 1011 | +5−3 |
| 1100 | +5−1 |
| 1101 | +5+1 |
| 1110 | +5+3 |
| 1111 | +5−5 |

until a word having a positive direct current component is generated, means to convert said four bit words into pulse signals of two symbols each with each symbol having six possible signal levels in accordance with the following second code

| Binary word | Code 2 |
|---|---|
| 0000 | −5+5 |
| 0001 | −1−3 |
| 0010 | −3−1 |
| 0011 | −3+1 |
| 0100 | +1−3 |
| 0101 | −3+3 |
| 0110 | +1−5 |
| 0111 | −1+1 |
| 1000 | +1−1 |
| 1001 | +2−5 |
| 1010 | +3−3 |
| 1011 | −5+3 |
| 1100 | −5+1 |
| 1101 | −5−1 |
| 1110 | −5−3 |
| 1111 | +5−5 |

after the generation of a pulse signal having a positive direct current component until a signal is generated having a negative direct current component, whereupon said conversion is again accomplished in accordance with said first code until a pulse signal is generated having a positive direct current component.

4. Apparatus for converting binary pulse signals into pulse signals having six possible signal levels so that the direct current level of the resulting signal is zero and the number of consecutive spaces is less than a predetermined number, comprising a four bit shift register connected to receive said binary pulse signals, sixteen AND gates each having five input terminals, four of which are connected to predetermined output terminals of said four bit shift register with the fifth input terminal of each of said AND gates connected to receive an enabling clock signal every fourth time slot so that an output signal from each of said AND gates represents the presence of a unique four bit binary word in said register, means to convert said four bit words into pulse signals of two symbols each having six possible signal levels in accordance with the following first code

| Binary word | Code 1 |
|---|---|
| 0000 | −5+5 |
| 0001 | +1+3 |
| 0010 | +3+1 |
| 0011 | +3−1 |
| 0100 | −1+3 |
| 0101 | −3+3 |
| 0110 | −1+5 |
| 0111 | −1+1 |
| 1000 | +1−1 |
| 1001 | −3+5 |
| 1010 | +3−3 |
| 1011 | +5−3 |
| 1100 | +5−1 |
| 1101 | +5+1 |
| 1110 | +5+3 |
| 1111 | +5−5 |

until a word having a positive direct current component is generated, means to convert said four bit words into pulse signals of two symbols each with each symbol having six possible signal levels in accordance with the following second code

| Binary word | Code 2 |
|---|---|
| 0000 | −5+5 |
| 0001 | −1−3 |
| 0010 | −3−1 |
| 0011 | −3+1 |
| 0100 | +1−3 |
| 0101 | −3+3 |
| 0110 | +1−5 |
| 0111 | −1+1 |
| 1000 | +1−1 |
| 1001 | +2−5 |
| 1010 | +3−3 |
| 1011 | −5+3 |
| 1100 | −5+1 |
| 1101 | −5−1 |
| 1110 | −5−3 |
| 1111 | +5−5 |

after the generation of a pulse signal having a positive direct current component until a signal is generated having a negative direct current component, whereupon said conversion is again accomplished in accordance with said first code until a pulse signal is generated having a positive direct current component, said conversion means comprising said above-recited six AND gates, ten OR gates connected to receive output signals from said AND gates and delayed replicas of said output signals so that in response to the first two bits of each of said four bit binary words one or more of said ten OR gates is enabled and in response to the second two bits of each of said four bit words one or more of said OR gates is enabled, six monostable circuits which generate reference voltages of +1, +2, +2, −1, −2, and −2 units of voltage respectively, the outputs of predetermined ones of said OR gates being connected to predetermined ones of said monostable circuits so that when in accordance with said above-recited codes a balanced two symbol six level word is to be generated, said word is generated by one or more of said monostable circuits in direct response to the outputs of one or more of said OR gates, ten AND gates connected to receive the output signals from five predetermined ones of said ten OR gates to encode four bit words producing an unbalanced direct current level signal, five of said OR gates being enabled when said direct current level of the output signal is negative and the other five of said OR gates being enabled when the direct current output signal is positive, the output signals of said group of ten AND gates being applied to said monostable circuits to generate output signals of the proper amplitude.

5. Apparatus for converting six level two symbol signals from a source of such signals into four bit binary output signals in accordance with the following predetermined code

| Code 1 | Code 2 | Binary word |
|---|---|---|
| −5+5 | −5+5 | 0000 |
| +1+3 | −1−3 | 0001 |
| +3+1 | −3−1 | 0010 |
| +3−1 | −3+1 | 0011 |
| −1+3 | +1−3 | 0100 |
| −3+3 | −3+3 | 0101 |
| −1+5 | +1−5 | 0110 |
| −1+1 | −1+1 | 0111 |
| +1−1 | +1−1 | 1000 |
| −3+5 | +2−5 | 1001 |
| +3−3 | +3−3 | 1010 |
| +5−3 | −5+3 | 1011 |
| +5−1 | −5+1 | 1100 |
| +5+1 | −5−1 | 1101 |
| +5+3 | −5−3 | 1110 |
| +5−5 | +5−5 | 1111 |

comprising, a first series of five AND gates, a second series of five AND gates, means to enable said first series of said AND gates during the presence of a first symbol of a transmitted six level signal, means to enable said second series of said AND gates during the transmission of the second symbol of a six level word, a bistable circuit connected to the output of each of said ten AND gates so that when each AND gate produces an output signal its respective bistable circuit is in the set condition, logic circuitry comprising eight inhibit gates each of which is connected to receive the output signal from one of eight of the twelve bistable circuits, the output terminals of the remaining four bistable circuits representing the maximum possible amplitude of the signal from said source, a series of twenty AND gates responsive to signals appearing at the output terminals of said inhibit gates and the signals representing the maximum amplitudes of said input signals, said twenty AND gates being paired together so that the output terminals of each pair are connected to a common OR gate so that the output of said OR gate indicates the presence of a four bit binary word which was transmitted as an unbalanced six level signal, five AND gates responsive directly to the output of said logic circuitry each of which produces an output signal during the generation of a balanced six level signal from said source, and means including pulse generating means responsive to the output signals from said OR gates and said AND gates and sequentially actuated four times during each two time slots of said transmitted signal to produce the binary representation thereof.

References Cited

UNITED STATES PATENTS

| | | | |
|---|---|---|---|
| 2,700,696 | 1/1955 | Barker | 340—347 |
| 2,996,578 | 8/1961 | Andrews | 178—70 |
| 3,126,537 | 3/1964 | Trampel | 340—347 |
| 3,149,323 | 9/1964 | Aaron | 340—347 |
| 3,154,777 | 10/1964 | Thomas | 340—347 |
| 3,302,193 | 1/1967 | Sipress | 340—347 |

MAYNARD R. WILBUR, *Primary Examiner.*

W. J. KOPACZ, *Assistant Examiner.*